May 26, 1925.  
C. F. SHEAFFER  
SPOTLIGHT SHIFT  
Filed Nov. 13, 1923

1,539,520

INVENTOR.  
Charles F. Sheaffer,  
BY Loyal J. Miller,  
ATTORNEY.

Patented May 26, 1925.

1,539,520

UNITED STATES PATENT OFFICE.

CHARLES F. SHEAFFER, OF OKLAHOMA CITY, OKLAHOMA.

SPOTLIGHT SHIFT.

Application filed November 13, 1923. Serial No. 674,435.

*To all whom it may concern:*

Be it known that I, CHARLES F. SHEAFFER, a citizen of the United States, residing at Oklahoma City, in the county of Oklahoma and State of Oklahoma, have invented a certain new and useful Invention in Spotlight Shifts, of which the following is a specification, reference being had to the accompanying drawings.

This invention relates to means for shifting spot lights in vehicles, particularly automobiles.

It has for its objects among others to provide simple means for operating the spot lights one at a time by and with the steering or running gear of the vehicle, so that that part of the road toward which the vehicle is traveling will be lighted.

It has for a further object to provide a device easily, cheaply and readily applicable to a vehicle without special adaptation or change in the vehicle structure, and at the same time strong, durable and capable of manufacture at small cost.

Other objects and advantages of the invention will hereinafter appear and the novel features thereof will be specifically defined by the appended claim.

The invention is clearly illustrated in the accompanying drawings, which, with the numerals of reference marked thereon, form a part of this specification and in which—

Like numerals of reference indicate like parts throughout the several views.

Referring to the drawings—

Figure 3:
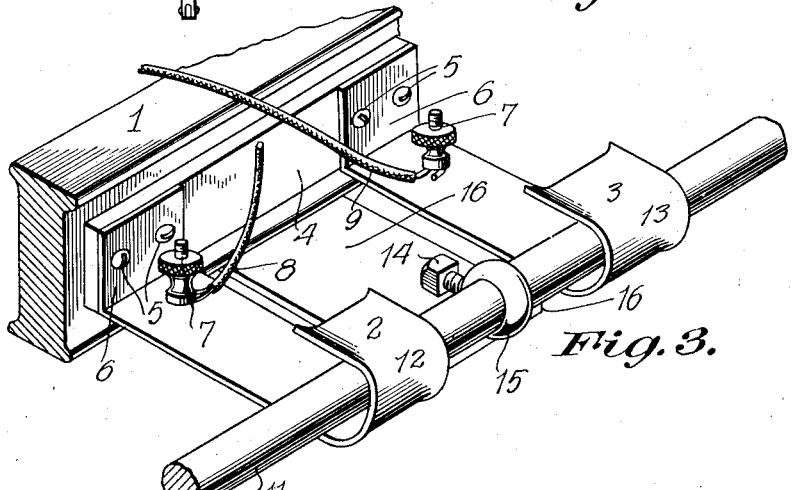
Figure 3 is an enlarged perspective view with parts in section.

1 designates the axle beam to which are secured the clips 2 and 3 upon an insulating block 4 secured to the axle beam 1 by bolts or the like 5 passed through the flanges 6 of the clips and into the block 4 and beam as seen clearly in Figure 3. Each clip carries a binding post 7 to which are connected the wires 8 and 9 leading to the lighting system of the car.

Figure 1:
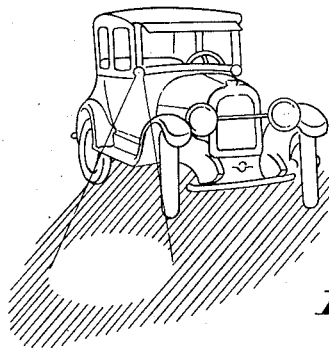
Figure 1 is a perspective view of a vehicle equipped with my present invention.
Figure 2:
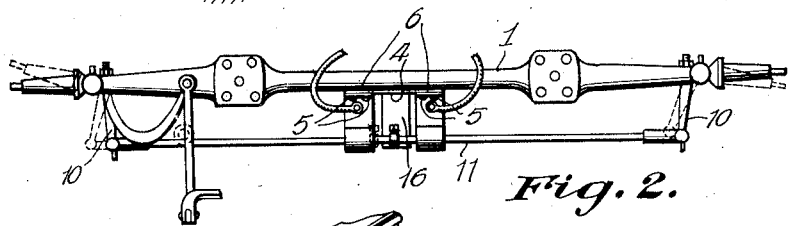
Figure 2 is a plan of the attachment.

10 are the steering arms of the car while 11 is the rod connecting the free ends of said arms as seen in Figure 2, the said clips having bent ends 12 and 13 respectively which embrace the rod 11, and on this rod is the collar or the like 15, between the clips and made adjustable on the rod by means of the adjusting screw or the like 14.

16 is an insulating block or plate for cooperation with the member 15.

Figure 4:
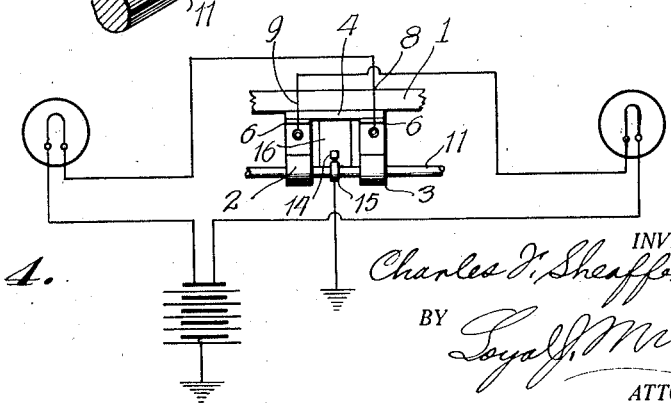
Figure 4 is a diagrammatic view showing the electrical connections.

The wiring is illustrated in Figure 4 and does not require detailed description.

When not in use the member 15 rests lightly, but with sufficient pressure to prevent rattling, on the insulating plate 16 and the attachment is disconnected and thrown out of operative position relative to the lighting system of the car.

The member 15 can be adjusted lengthwise of the member 11 as may be desired. When the rod 11 is shifted with the movement of the steering mechanism the said member 15 is moved to the right or left as the case may be, out of contact with the insulating plate 16 and into contact with one or the other of the clips and thus into circuit with the spot light on the right or left and lights the one spot light or the other, and vice versa, when the car is turned in the other direction.

The spot lights are placed so as to be slanting and directed angularly longitudinally of the vehicle and facing in opposite directions so as to diverge, forwardly, downwardly and outwardly. When the car is again turned to normal straight running the member 15 is again brought to its normal position on the insulating block and neither of the spot lights will be lighted.

It is not the intention to light one or the other of the spot lights with every little shift of the steering gear, but only with such shifts as perceptibly turn the car out of its normal course. This can be arranged by the size of the insulating plate 16 between the clips.

Having thus described this invention, I claim:

An attachment of the character described, embodying clips for attachment to the axle of a motor vehicle, a member for application to and movable with the steering mechanism of the car and operable with the latter and movable between said clips, and electrical connections between said clips and spot lights on the car, normally out of operative relation with said clips.

Signed at Oklahoma, in the county of Oklahoma and State of Oklahoma this 15 day of September in the year of our Lord, nineteen hundred and twenty-three.

CHARLES F. SHEAFFER.